United States Patent
Huynh et al.

(10) Patent No.: US 7,636,246 B2
(45) Date of Patent: Dec. 22, 2009

(54) START-UP TIME REDUCTION IN SWITCHING REGULATORS

(75) Inventors: Steven Huynh, Sunnyvale, CA (US); Zhibo Tao, San Jose, CA (US); David Kunst, Cupertino, CA (US)

(73) Assignee: Active-Semi, Inc. (VG)

( * ) Notice: Subject to any disclaimer, the term of this patent is extended or adjusted under 35 U.S.C. 154(b) by 271 days.

(21) Appl. No.: 11/891,397

(22) Filed: Aug. 10, 2007

(65) Prior Publication Data

US 2009/0040793 A1 Feb. 12, 2009

(51) Int. Cl.
*H02M 3/335* (2006.01)

(52) U.S. Cl. ...................... 363/21.09; 363/97
(58) Field of Classification Search ............. 363/16–20, 363/21.01, 21.05, 21.12–21.17, 97, 98, 86, 363/80, 65; 323/222, 266, 282–286, 289
See application file for complete search history.

(56) References Cited

U.S. PATENT DOCUMENTS

| | | | |
|---|---|---|---|
| 4,629,971 A * | 12/1986 | Kirk ........................... 323/289 |
| 5,313,381 A | 5/1994 | Balakrishnan ............... 363/147 |
| 5,438,499 A * | 8/1995 | Bonte et al. ............... 363/21.16 |
| 5,446,366 A | 8/1995 | Bassett et al. ................ 323/222 |
| 5,600,546 A | 2/1997 | Ho et al. ........................ 363/21 |
| 5,652,700 A | 7/1997 | Tasi et al. ...................... 363/21 |
| 2004/0037098 A1 | 2/2004 | Konno .......................... 363/49 |
| 2005/0169019 A1 | 8/2005 | Konno .......................... 363/49 |

* cited by examiner

*Primary Examiner*—Rajnikant B Patel
(74) *Attorney, Agent, or Firm*—Imperium Patent Works; Clen Choi; Darien K. Wallace (57) ABSTRACT

A start-up time accelerator is described for a switch controller that controls turning on or off a switch in a switching regulator. The start-up time accelerator uses the switch as a current amplifier and provides the amplified current to a capacitor using a current amplification path. In one example, the capacitor provides the bias voltage to a switch controller for the switch. Providing an amplified current to the capacitor accelerates the rate at which the bias voltage increases and reduces the time until the bias voltage reaches the turn-on threshold voltage of the switch controller. After the turn-on threshold voltage of the switch controller is reached, a second path is enabled for current to and from the capacitor and the capacitor provides the bias voltage to the switch controller until a voltage from an output voltage terminal is sufficiently high to provide the bias voltage for the switch controller through an auxiliary winding of a transformer.

27 Claims, 5 Drawing Sheets

START-UP TIME REDUCTION IN SWITCHING REGULATORS

TECHNICAL FIELD

The disclosed embodiments relate to the field of power conversion, more specifically, to accelerating start-up time of switch controllers in switch mode power supply circuits.

BACKGROUND INFORMATION

Figure 1:
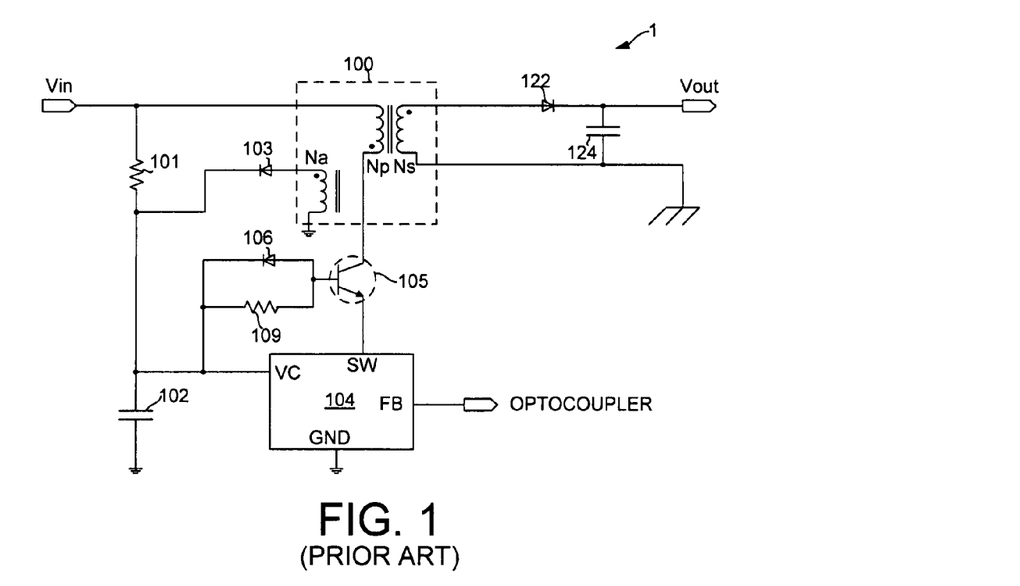
FIG. 1 (Prior Art) is a block diagram of a simple flyback converter that is controlled from a primary side and that operates in an emitter switching configuration.

A circuit known as a flyback converter is a switch mode power supply circuit commonly used in applications such as AC-to-DC wall adapter power supplies and battery chargers. FIG. 1 (Prior Art) is a block diagram of a simple flyback converter 1 that is controlled from the primary side of the power converter transformer and that operates in an emitter switching configuration. Flyback converter 1 includes a transformer 100 which has primary, secondary, and auxiliary windings. On the primary side, flyback converter 1 includes start-up resistor 101, capacitor 102, rectifier 103, switcher circuit 104, an NPN bipolar transistor switch 105, diode 106, and resistor 109. On the secondary side, flyback converter 1 includes a secondary rectifier 122 and an output capacitor 124. An alternating current (AC) line voltage may, for example, be rectified by a full wave bridge rectifier (not shown) and an associated smoothing capacitor (not shown) so that the rectified and smoothed DC voltage is present at terminal Vin.

Flyback converter 1 operates by repeatedly turning on and off NPN transistor 105. Turning on NPN transistor 105 causes a current to flow from a first input node Vin, through a primary side winding (having Np number of turns) of a transformer 100, through NPN transistor 105, and into SW terminal of switcher circuit 104. Turning off NPN transistor 105 causes the voltage at the dot end of the primary winding, and hence, the secondary side winding (having Ns number of turns) to swing positive, which causes current to flow through the rectifier diode 122 and into capacitor 124 to produce a DC output voltage at terminal Vout. Switcher circuit 104 controls the turning on and off of NPN transistor 105 from the emitter terminal of NPN transistor 105 by opening and closing a switch, which is connected between terminals SW and GND. An optocoupler circuit (not shown) provides feedback from the secondary side of transformer 200 to terminal FB of switcher circuit 104 to regulate the output voltage Vout.

The start-up time of flyback converter 1 is from the time a valid input voltage is present, Vin, which is greater than a minimum input voltage, to a time when a desired regulated output voltage, VREG, is provided at output voltage terminal Vout. During start-up, the voltage at terminal Vout rises from zero volts to the desired regulated output voltage, VREG. The start-up time depends on the RC start-up time constant, which is the product of the resistance of resistor 101 and the magnitude of capacitance of capacitor 102. As will be shown, the resistance of resistor 101 and capacitance of capacitor 102 are chosen to be large, which results in a large RC time constant and a long start-up time.

According to certain energy conservation standards, power consumption during standby mode for low power chargers is limited to a maximum of 300 milliwatts. Standby mode is when an input voltage is present at terminal Vin but no device draws power from terminal Vout. The resistance of resistor 101 is large to minimize power consumption during standby mode because power consumption of resistor 101 depends inversely on the resistance of resistor 101. The power consumption of resistor 101 is represented as:

$$P = (Vin - VC)^2 / R_{101}$$

For a 265 V RMS AC input line, the voltage at terminal Vin is as high as 375 V DC. For example, when VC is 15 V and $R_{101}$ is 1.5 megaohms, the power dissipation from resistor 101 is 86 milliwatts, which accounts for almost one third of the maximum power consumption permitted by flyback converter 1 during standby mode.

Figure 2:
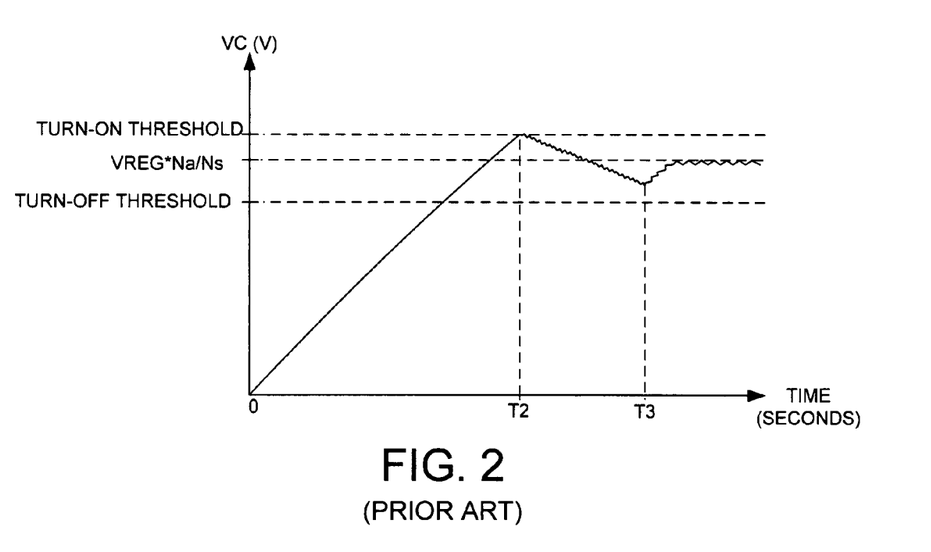
FIG. 2 (Prior Art) is a simplified depiction of a voltage signal at a bias terminal for a switcher circuit.

The use of capacitor 102 is illustrated with regard to the waveform diagram of FIG. 2. The turn-on threshold voltage (shown as "TURN-ON VOLTAGE") is the voltage at which switcher circuit 104 starts turning on or off NPN transistor 105 whereas the turn-off threshold voltage (shown as "TURN-OFF VOLTAGE") is the voltage at which switcher circuit 104 stops operating. For example, the turn-on threshold voltage is 20 V and the turn-off threshold voltage is 10 V. Capacitor 102 has a large capacitance value because capacitor 102 supplies power to switcher circuit 104 at terminal VC after terminal VC reaches the turn-on threshold voltage (time T2 in FIG. 2) until the output voltage, Vout, is large enough so that the auxiliary winding powers switcher circuit 104 (at time T3) while also maintaining the voltage at terminal VC above the turn-off threshold voltage. Were the capacitance of capacitor 102 not large enough, then after time T2, the voltage at terminal VC would fall to below the turn-off threshold voltage and switcher circuit 104 would turn-off thereby causing flyback converter 1 to malfunction. From time T2 to time T3, the output voltage Vout rises until time T3, when the auxiliary voltage, which is approximately Vout*Na/Ns (neglecting the voltage drop across rectifier diode 122), exceeds the voltage at terminal VC supplied by capacitor 102. From time T3 onward, the auxiliary winding supplies power to switcher circuit 104 through terminal VC. The voltage at terminal VC settles to a constant voltage of approximately VREG*Na/Ns because the output voltage, Vout, settles to a regulated output voltage, VREG.

Capacitor 102 also has a large capacitance value because capacitor 102 supplies current to the base terminal of NPN transistor 105 when NPN transistor 105 is turned-on. When VC is 15 V and the resistor 109 is 500 ohms, the base current to NPN transistor 105 is approximately 30 milliamperes. For a 60 kHz switching cycle, capacitor 102 supplies 30 milliamperes of base current during the on-time portion of the switching cycle.

The large values of resistance of resistor 101 and capacitance of capacitor 102 result in a large RC time constant and a long start-up time for switcher circuit 104. For example, when the resistor 101 is 1.5 megaohms, capacitor 102 is 10 microfarads, Vin DC is 155 V (from a 110 V AC input), and the turn-on threshold voltage is 20 V, then the time to turn-on switcher circuit 104 (i.e., the time to reach time T2) is represented approximately as:

$$T_{turn-on} \approx (R_{101} * C_{102} * V_{TURN-ON\ THRESHOLD}) / Vin\ DC$$

Using the values supplied above, the time to turn-on the switcher circuit 104 is approximately 1.9 seconds. Unfortunately, in some applications, this long start-up time of a flyback converter 1 is not acceptable. Some applications require a startup time of less than 100 milliseconds. A market exists for switching regulator systems with lower start-up times.

SUMMARY

In accordance with one aspect, a start-up time accelerator is described for a switch controller that controls turning on or off of a switch in a switching regulator. The start-up time accelerator reduces the start-up time of the switching regulator by reducing a time to reach a turn-on threshold voltage of a switch controller. In one aspect, the switch is an NPN bipolar power transistor. During start-up, the start-up time accelerator uses the switch as a current amplifier and provides the amplified current to a capacitor using a current amplification path. The capacitor provides the bias voltage to a switch controller for the switch. Providing an amplified current to the capacitor accelerates the rate at which the bias voltage increases and reduces the time until the bias voltage reaches the turn-on threshold voltage of the switch controller. After the turn-on threshold voltage of the switch controller is reached, the current amplification path is disabled and a second path is enabled for current to and from the capacitor. In addition, after the turn-on threshold voltage of the switch controller is reached, the capacitor provides the bias voltage to the switch controller until a voltage from the auxiliary winding of a transformer is large enough to provide the bias voltage for the switch controller.

In one aspect, during start-up, when the bias voltage is less than a turn-on threshold voltage for the switch controller, a comparator closes a first switch in the current amplification path to allow current from an emitter terminal of the switch to the capacitor. When the bias voltage reaches the turn-on threshold voltage for the switch controller, the comparator opens the first switch in the current amplification path and closes a second switch in the second path to allow current flow through the second path to and from the capacitor. In one embodiment, the first and second switches are gate controlled P-channel field-effect transistors (PFETs). In another embodiment, the second switch is replaced with a diode that permits current flow from the capacitor and the second path is two diodes in series.

The start-up time accelerator may, for example, be used in a wall adapter power supply or in a battery charger. The wall adapter power supply or battery charger supplies a DC output voltage. The output voltage Vout is regulated in a constant voltage mode of operation. The wall adapter power supply or battery charger supplies an output current to a load connected to the output terminal.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
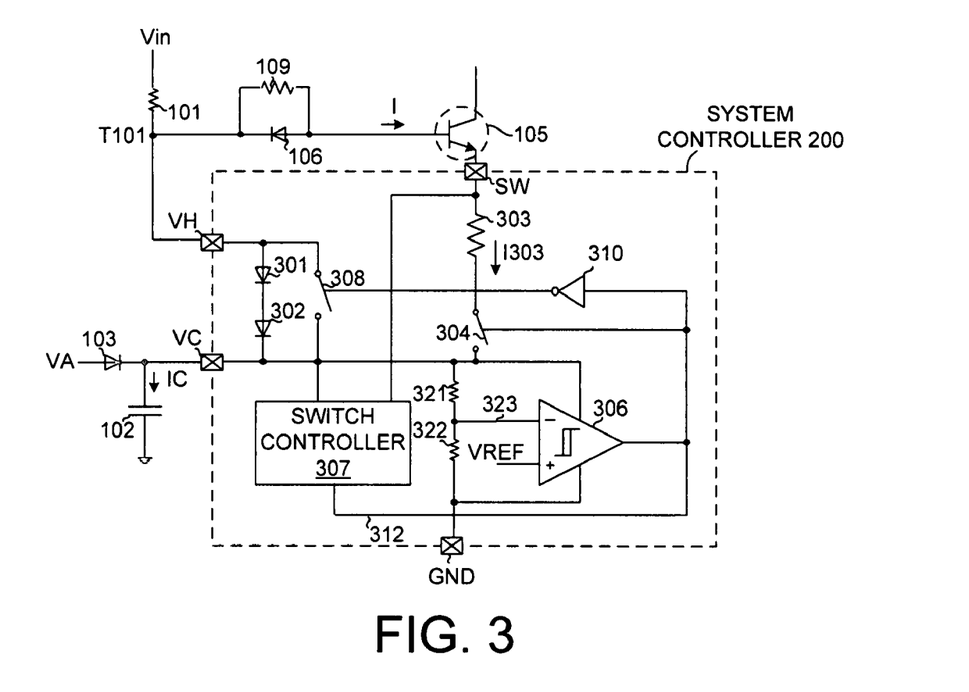
FIG. 3 is a simplified schematic diagram of a system controller that controls the operation of an NPN transistor, in accordance with one novel aspect.

FIG. 3 depicts a simplified schematic diagram of a system controller 200 in which NPN transistor 105, which also acts as a switch, is used to amplify the current supplied to capacitor 102 during start-up and accordingly reduces the time to when a desired output voltage is provided. One advantage of this embodiment is that additional components are not used to reduce the start-up time but rather an existing component which is also used as a switch, namely NPN transistor 105, is used. System controller 200 is used in flyback converter 1 of FIG. 1 in place of switcher circuit 104. The system depicted in FIG. 3 operates in initial mode, amplification mode, or switch mode. After an overview of system controller 200, reference will be made to the waveform diagram of FIG. 5 for an example operation of the system of FIG. 3 during initial mode, amplification mode, and switch mode.

In one implementation, NPN transistor 105 is an NPN bipolar power transistor. Switch controller 307 turns on or off NPN transistor 105 by controlling a voltage at the emitter terminal of transistor 105. Resistor 109 provides a conductive path from terminal T101 to the base terminal of NPN transistor 105. A current is supplied through resistor 109 to the base terminal of transistor 105 when transistor 105 operates in amplification mode or switch mode. Diode 106 allows transistor 105 to turn off faster because it provides a low impedance path from the base terminal.

In one aspect, comparator 306 is implemented as an Under-Voltage Lockout (UVLO) band gap comparator with hysteresis so that the state of its output remains the same until a turn-on or turn-off threshold voltage is reached at terminal VC. Comparator 306 controls whether switches 304 and 308 are open or closed based on a comparison between a reference voltage, VREF, and a voltage at terminal 323. When a switch is closed, current flows through the switch but when a switch is open, current does not flow through the switch. The resistances of resistors 321 and 322 are selected so that the following voltage is achieved at terminal 323 to comparator 306:

$$V_{TURN\text{-}ON\ THRESHOLD} * (R_{322})/(R_{321}+R_{322}) = VREF.$$

In some implementations, $V_{TURN\text{-}ON\ THRESHOLD}$ is 20 V and VREF is 1.2 V. When the voltage at terminal 323 rises above VREF and trips comparator 306, the hysteresis of comparator 306 lowers the trip point to establish the turn-off threshold, for example, by introducing an offset voltage at the input stage of comparator 306 to effectively reduce the reference voltage on the comparator's non-inverting input terminal, such that the comparator's trip point is lower when the voltage at terminal 323 falls from the turn-on threshold voltage.

Figure 4:
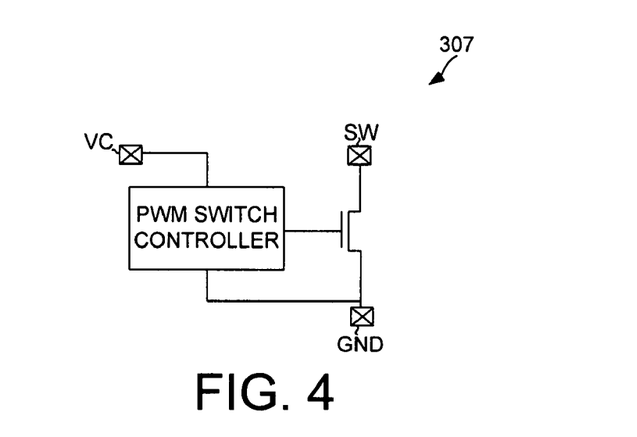
FIG. 4 is a simplified schematic diagram of a switch controller, in accordance with an embodiment.

In an implementation, system controller 200 includes terminals SW, VH, VC, and GND (ground). Resistor 303 and a closed switch 304 provide a current amplification path for current from terminal SW to terminal VC. Switch controller 307 controls whether NPN transistor 105 turns on or off by supplying control signals which opens and closes a switch which is connected between terminal SW and terminal GND. FIG. 4 depicts a simplified schematic diagram of an implementation of switch controller 307, in accordance with an embodiment. As shown in FIG. 4, in one aspect, switch controller 307 includes a PWM switch controller that outputs a pulse width modulated control signal to a gate terminal of an N-type FET switch. The drain terminal of the FET switch provides the switching signal to the emitter terminal of NPN transistor 105 through terminal SW.

For current from terminal VH to terminal VC, closed switch 308 provides a first current path whereas diodes 301 and 302 provide a second current path. As illustrated, terminal VC is the power supply terminal for system controller 200. The dotted line around system controller 200 represents boundaries of an integrated circuit implementation of system controller 200. In one aspect, only one additional terminal is added to an integrated circuit implementation of system controller 200, namely terminal VH, to provide start-up acceleration.

Initial Mode

Figure 5:
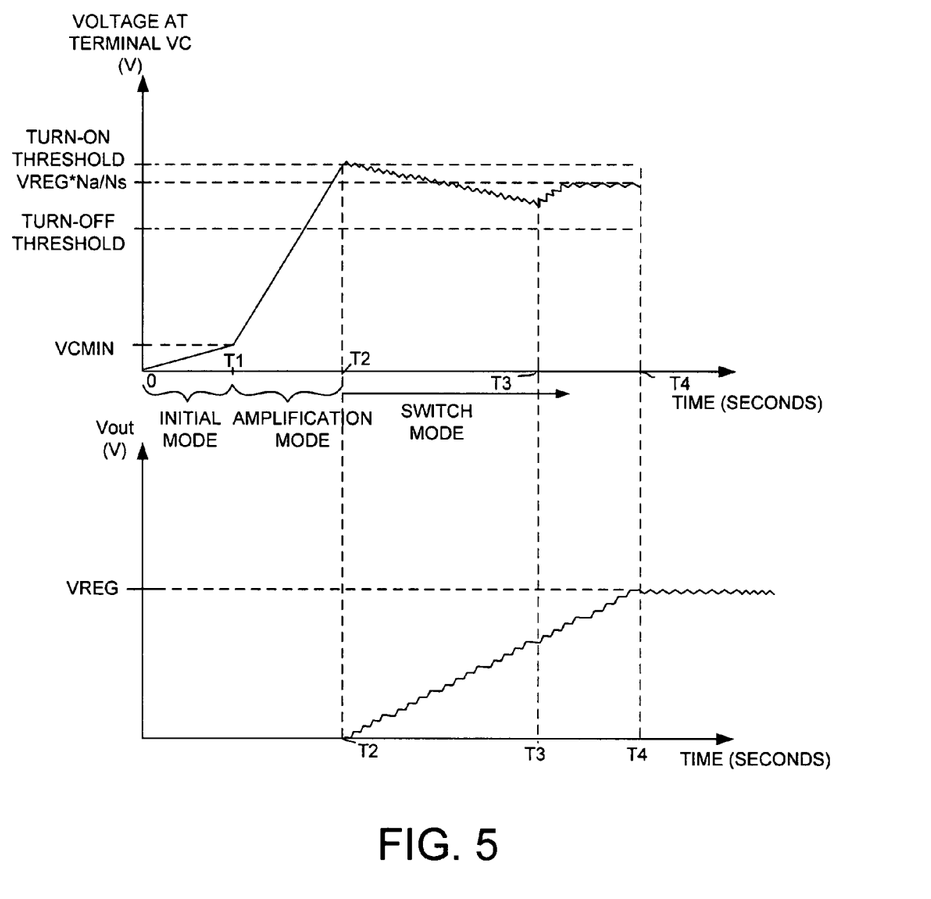
FIG. 5 is a simplified waveform diagram of a bias voltage signal at terminal VC and an output voltage signal, in accordance with an embodiment.

Referring to FIG. 5, initial mode takes place from time 0 to T1. During initial mode, the voltage at terminal Vin is a rectified DC voltage and a current is provided through resistor 101, through diodes 301 and 302, to capacitor 102. An optional zener diode can be used to clamp the voltage at terminal VC to a suitable level.

In response to receiving current, capacitor 102 increases the voltage at terminal VC. At time T1, when a minimum operating voltage for comparator 306 is present at terminal VC (e.g., approximately 1 V), comparator 306 turns on and outputs a signal to close switch 304. The turn-on threshold voltage for comparator 306 is shown as VCMIN in FIG. 5. The signal that closes switch 304 is inverted using inverter 310 and opens switch 308.

Amplification Mode

Amplification mode takes place from time T1 to time T2. During amplification mode, there are two paths for current from terminal T101 to terminal VC. One path is through two forward diodes 301 and 302 while the other path is the current amplification path through resistor 109, base to emitter terminals of NPN transistor 105, resistor 303, and closed switch 304. A current path through diodes 301 and 302 is available if the voltage difference between terminals VH and VC is greater than two diode voltage drops. If the current $I_{303}$ through resistor 303 is too large, current $I_{303}$ is limited because diodes 301 and 302 turn on and clamp the voltage at terminal T101 with respect to the voltage at terminal VC. Diodes 301 and 302 and resistor 303 limit the magnitude of current $I_{303}$ through resistor 303, as is described in more detail below.

During amplification mode, the base-emitter voltage of NPN transistor 105 is forward biased and its base-collector voltage is reverse biased (collector voltage is greater than emitter voltage). This mode of operation is also called forward active mode. Accordingly, current received at the base terminal of transistor 105 (shown as I) is amplified by $(1+\beta)$ and provided as current $I_{303}$ through switch 304 to capacitor 102. Accordingly, starting at time T1, provided that the current limit for current $I_{303}$ through resistor 303 does not hit the current limit ILIM (described below) and the current $I_{303}$ is not limited by use of diodes 301 and 302, current available to charge capacitor 102 becomes up to $(1+\beta)$ times larger than before and thus reduces the RC time constant by up to $(1+\beta)$ and causes the time to reach the turn-on threshold voltage of the system of FIG. 1 to be approximately divided by up to $1+\beta$. Accordingly, neglecting the initial mode from time 0 to time T1, the minimum time to reach the turn-on threshold voltage is the time to reach the turn-on threshold voltage by the system of FIG. 1 divided by $1+\beta$. Should the current $I_{303}$ through resistor 303 hit the current limit ILIM, the amplification of current I is less than $1+\beta$ and the time to reach the turn-on threshold voltage is more than the turn-on threshold voltage of the system of FIG. 1 divided by $1+\beta$.

For example, if from time 0 to time T1, the slope of the voltage rise at terminal VC is value SLOPE1, then the slope from time T1 to T2 is at most approximately $(1+\beta)*$SLOPE1. If the current $I_{303}$ through resistor 303 does not hit the current limit ILIM, the maximum slope of voltage rise at terminal VC from time T1 to time T2 can be expressed as:

$$SLOPE2 = \frac{(1+\beta)*I}{C102}$$

where, I is current into base terminal of NPN transistor 105 and C102 is capacitance of capacitor 102.

A bulk of the time to reach start-up involves the time for capacitor 102 to store enough charge to provide a bias voltage equal to the turn-on threshold voltage. Using NPN transistor 105 as a current amplifier increases the current supplied to capacitor 102 and accordingly, reduces the time for capacitor to store enough charge to supply a bias voltage equal to the turn-on threshold voltage.

In some cases it is desirable to control the duration of time to turn-on the flyback converter to be predictable. Beta values vary from transistor to transistor and vary with changes in temperature. For example, the beta of NPN transistor 105 can vary from 10 to 100 or more. Because the Beta is difficult to control, the time to reach turn-on is difficult to predict. Use of resistor 303 allows for more predictable control of the magnitude of current provided to capacitor 102 and accordingly, provides for a predictable duration of time to reach the turn-on threshold voltage for switch controller 307. During amplification mode, resistor 303 limits the current $I_{303}$ provided to capacitor 102. Resistor 303 limits the current $I_{303}$ to approximately:

$$ILIM = \frac{2 \cdot Vd - Vbe}{R_{303}}$$

where, Vd is the forward diode voltage drop of a diode, Vbe is the base-emitter voltage drop of NPN transistor 105, and $R_{303}$ is the resistance of resistor 303. Assuming Vd is approximately equal to Vbe, then $ILIM \approx Vd/R_{303}$.

Reference voltage VREF is a reference voltage for comparator 306. When a voltage at terminal VC reaches the Under-Voltage Lockout turn-on threshold voltage (shown as TURN-ON THRESHOLD in FIG. 5), the voltage at terminal 323 equals VREF and comparator 306 enables operation of switch controller 307 via terminal 312. Prior to enabling operation of switch controller 307, switch controller 307 operates in low power consumption mode. If the voltage at terminal VC drops to the UVLO turn-off threshold (shown as TURN-OFF THRESHOLD), then comparator 306 detects that the voltage VC is less than the turn-off threshold and disables switch controller 307. For example, if the voltage at terminal VC reaches the turn-on threshold voltage, comparator 306 outputs a logic zero until the voltage at VC diminishes to the turn-off threshold voltage, and comparator 306 outputs a logic one.

Switch Mode

Starting at time T2, when the voltage at terminal VC reaches the turn-on threshold voltage, the output from comparator 306 goes low thereby opening switch 304 and closing switch 308. After time T2, because of hysteresis, the output from comparator 306 remains low unless the voltage at terminal VC drops below the turn-off threshold voltage.

Starting at time T2, switch controller 307 turns on and controls turning on and off NPN transistor 105, which is operating as a switch. Switch controller 307 includes a FET transistor that generates the signal that turns on and off NPN transistor 105.

When NPN transistor 105 is in an on state, capacitor 102 supplies current to the base terminal of NPN transistor 105 through closed switch 308. When NPN transistor 105 is in an off state, current discharges from terminal VH to terminal VC through closed switch 308 to capacitor 102. Diodes 301 and 302 are a possible current path to capacitor 102 if switch 308 is not available as a current path.

Between times T2 and T3, capacitor 102 supplies the current to the base terminal of NPN transistor 105 and also supplies power to terminal VC. As shown in FIG. 5, the voltage level at terminal VC sags because capacitor 102 dissipates charge to supply the bias voltage at terminal VC and to supply current to the base terminal of NPN transistor 105. Beginning at time T2, because of the switching operation of NPN transistor 105 and energy transfer from the primary side to the secondary side of the transformer, the output voltage Vout rises from zero volts. Every switching cycle transfers energy from the primary winding to the secondary winding, which increases Vout.

Beginning at about time T3, before the voltage at terminal VC sags to the turn-off threshold voltage, the voltage provided by the auxiliary winding at terminal VC exceeds the voltage across capacitor 102 and the auxiliary winding supplies power to terminal VC through terminal VA. At and after time T3, when the auxiliary winding supplies power to terminal VC, the voltage at terminal VC rises. The voltage at terminal VA is defined by the following relationship:

$$V\text{aux}=(V\text{out}+V_{rectifier\ 122})*(Na/Ns)$$

where Na/Ns is the ratio of auxiliary windings to secondary windings and $V_{rectifier\ 122}$ is the voltage drop across rectifier 122.

From time T4 onward, the voltage at terminal VC is maintained approximately steady as approximately the regulated output voltage, VREG, times Na/Ns. From time T4 onward, when NPN transistor 105 is on, capacitor 102 provides the bias voltage at terminal VC and the base current to NPN transistor 105 but when NPN transistor 105 is off, the auxiliary winding supplies the bias voltage to terminal VC and the auxiliary winding charges capacitor 102.

Figure 6:
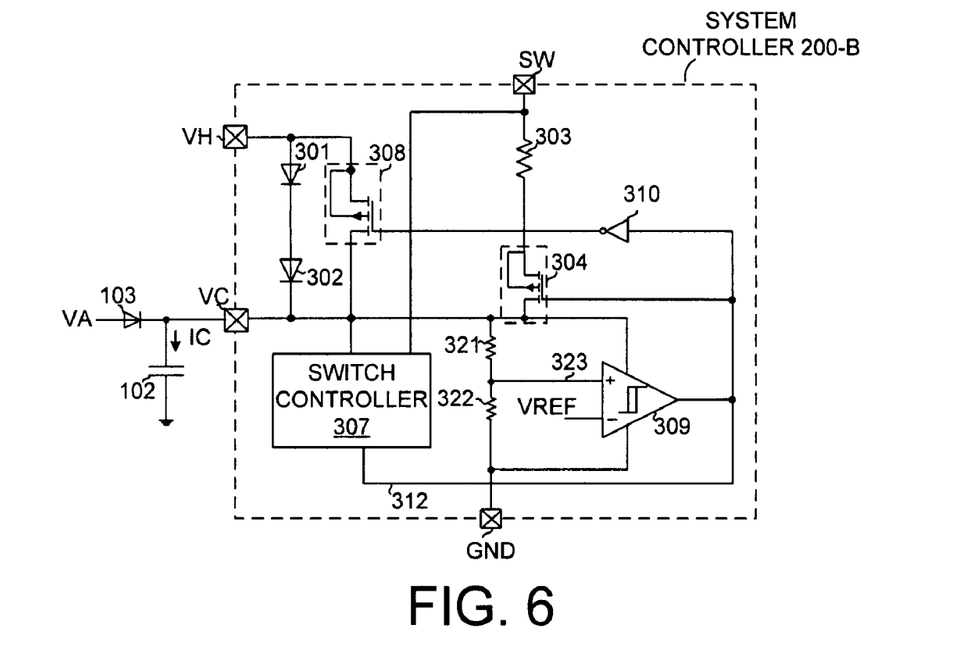
FIGS. 6 and 7 are simplified schematic diagrams of system controllers, in accordance with embodiments.

FIG. 6 depicts another embodiment of a system controller 200-B in which switches 304 and 308 are implemented as gate controlled P channel FET transistors. A gate controlled P channel FET transistor is on when a sufficient negative voltage is presented at the gate terminal with respect to its source terminal.

Figure 7:
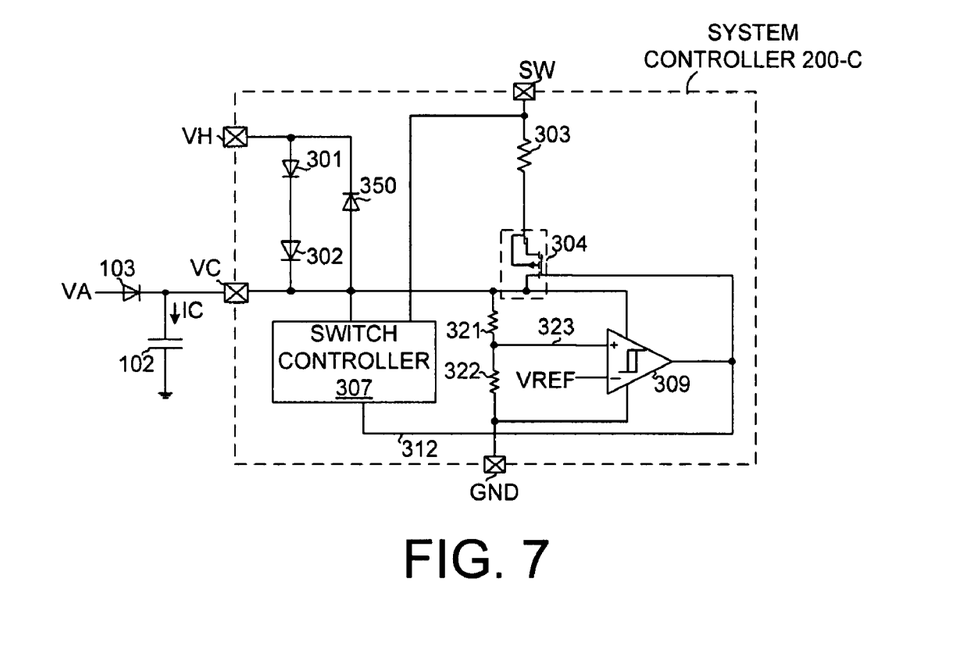

FIG. 7 depicts another embodiment of a system controller 200-C in which switch 308 of FIG. 3 is replaced with a diode that allows current to flow from terminal VC to terminal VH. Diode 350 provides a current path for current from capacitor 102 to the base terminal of NPN transistor 105. In addition, a current path from terminal VH to terminal VC is provided through diodes 301 and 302. When the NPN transistor 105 is switched off, current discharge from the base terminal of NPN transistor 105 to capacitor 102 takes place through diodes 301 and 302.

Figure 8:
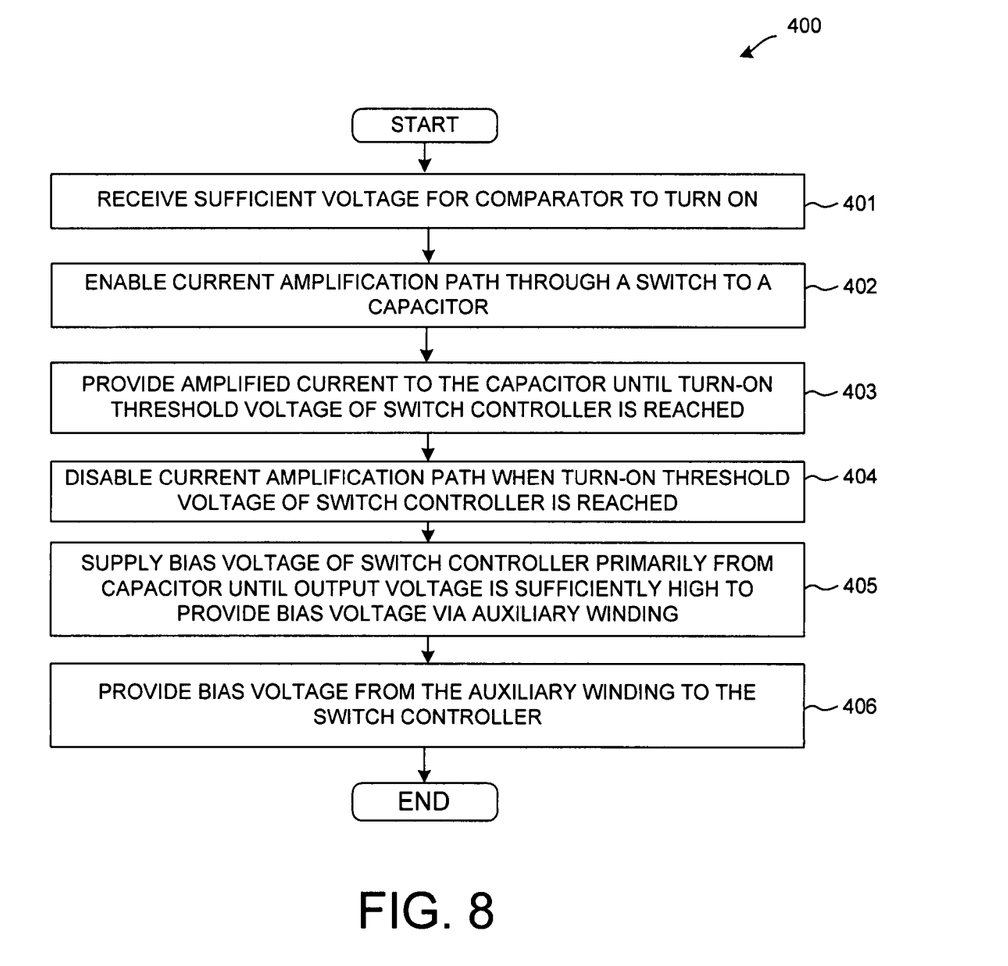
FIG. 8 is a diagram of a method of reducing start-up time of a switch controller, in accordance with one novel aspect.

FIG. 8 depicts a flow diagram of a process for reducing a time to start switching mode operation of a switch controller in accordance with an embodiment. In action 401, a comparator receives a sufficient voltage to turn on. Referring to FIGS. 3, comparator 306 turns on when VCMIN (e.g., 1 V) is available at terminal VC. In action 402, a current amplification path through a switch to a capacitor is enabled. Referring to FIG. 3, in action 402, comparator 306 outputs a high voltage and causes switch 304 to close to create a current amplification path from the base to emitter terminals of NPN transistor 105 through resistor 303 and closed switch 304 to capacitor 102. In action 403, the switch provides amplified current to the capacitor until the turn-on threshold voltage of the switch controller is reached. Referring to FIG. 3, in action 403, NPN transistor 105 operates in forward active mode and amplifies current received at its base terminal and provides amplified current through its emitter terminal to the current amplification path. Accordingly, the magnitude of current provided to capacitor 102 is increased by use of NPN transistor 105 as a current amplifier. The increase in current increases the charge stored by capacitor 102 and decreases the time for capacitor 102 to reach the turn-on threshold voltage and enable switch controller 307. In action 404, when the turn-on threshold voltage of the switch controller is reached, the current amplification path is disabled. Referring to FIG. 3, in action 404, comparator 306 detects that the turn-on threshold voltage of the switch controller is reached and comparator 306 outputs a low voltage which causes switch 304 to open and switch 308 to close. Opening switch 304 disables the current amplification path. In action 405, the capacitor primarily supplies the bias voltage until the output voltage is sufficiently high to supply a bias voltage to the switch controller via the auxiliary winding. Referring to FIG. 3, in action 405, capacitor 102 primarily supplies the bias voltage to switch controller 307 so that switch controller 307 controls the turning on and off of the NPN transistor 105. An auxiliary voltage is generated at the auxiliary winding which rises proportionally with the voltage Vout. When the voltage from the auxiliary winding provided to terminal VC (which is approximately Vout*Na/Ns) exceeds the voltage on capacitor 102 at terminal VC, the auxiliary winding provides the bias voltage to switch controller 307. In action 406, the auxiliary winding provides the bias voltage to the switch controller. Thereafter, when NPN transistor 105 is on, capacitor 102 provides bias voltage at terminal VC and provides the base current to NPN transistor 105 but when NPN transistor 105 is off, the auxiliary winding supplies the bias voltage at terminal VC and the auxiliary winding charges capacitor 102.

Although certain specific exemplary embodiments are described above in order to illustrate the invention, the invention is not limited to the specific embodiments. System controller 200 can be used in any switching regulator and not just a flyback converter. It can be applied to a wide range of power supplies, converters, regulators, chargers, adapters, sources, and references. For example, switch controller 200 can be used wherever a capacitor is involved with starting up a switch controller. Diodes 301 and 302 can be outside the integrated circuit boundary shown by dotted lines. All diodes could be diode connected P channel MOSFETs. Resistor 303 can be implemented as a programmable resistor. Resistor 303 can be removed. Accordingly, various modifications, adaptations, and combinations of various features of the described embodiments can be practiced without departing from the scope of the invention as set forth in the claims.

What is claimed is:

1. A method comprising:
    amplifying a first current using a power transistor, wherein the power transistor controls whether current flows through a primary winding of a transformer; and supplying a bias voltage to a switch controller for the power transistor and the first current to the power transistor, wherein whether the switch controller turns on depends on whether the bias voltage reaches a turn-on voltage, wherein a duration of time to turn on the switch controller depends on a rate of increase of the bias voltage, and wherein the rate of increase of the bias voltage depends on a magnitude of the amplifying.

2. The method of claim 1, wherein the supplying comprises using a capacitor coupled to the switch controller.

3. The method of claim 2, further comprising:
routing the amplified current to the capacitor through a first route prior to the bias voltage reaching the turn-on voltage.

4. The method of claim 3, wherein routing the amplified current to the capacitor through the first route comprises closing a gate to provide a conductive path between an emitter terminal of the power transistor and the capacitor.

5. The method of claim 2, further comprising:
routing the first current to the capacitor through a second route after the bias voltage reaches the turn-on voltage.

6. The method of claim 1, further comprising:
supplying the bias voltage to the switch controller using an auxiliary winding of the transformer after the bias voltage reaches the turn-on voltage.

7. The method of claim 1, wherein the amplifying a first current using a power transistor comprises amplifying the first current by β+1 and wherein β is a gain provided by the power transistor.

8. The method of claim 1, wherein the power transistor comprises an NPN power transistor that is emitter switched based on an input signal from the switch controller.

9. The method of claim 1, wherein the switch controller controls whether the power transistor permits or stops current flow through the primary winding.

10. A system comprising:
a transformer having primary, auxiliary, and secondary windings;
a power transistor coupled to the primary winding;
a system controller that controls whether the power transistor amplifies current or operates as a switch, wherein the system controller comprises a switch controller coupled to the power transistor and the switch controller controls an on or off state of the power transistor when the power transistor operates as a switch; and
a capacitor that supplies a voltage to the system controller, wherein the system controller causes the power transistor to amplify a current provided to the capacitor prior to the voltage reaching a turn-on threshold voltage for the switch controller and wherein a duration of time to turn-on the switch controller depends in part on a magnitude of an amplified current provided to the capacitor.

11. The system of claim 10, wherein the system controller comprises:
a comparator, wherein the comparator indicates whether the turn-on threshold voltage for the switch controller has been reached.

12. A system comprising:
a transformer having primary, auxiliary, and secondary windings;
a power transistor coupled to the primary winding;
a system controller that controls whether the power transistor amplifies current or operates as a switch; and
a capacitor that supplies a voltage to the system controller, wherein the system controller comprises:
a switch controller coupled to the power transistor, wherein the switch controller controls an on or off state of the power transistor when the power transistor operates as a switch;
a comparator that indicates whether a turn-on threshold voltage for the switch controller has been reached;
a resistor coupled to an emitter terminal of the power transistor; and
a first switch coupled between the resistor and the capacitor, wherein the comparator controls whether the first switch is open and wherein the amplified current flows through the resistor and the first switch prior to when the turn-on threshold voltage for the switch controller is reached, wherein the system controller causes the power transistor to amplify a current provided to the capacitor prior to the voltage reaching the turn-on threshold voltage for the switch controller and wherein a duration of time to turn-on the switch controller depends in part on a magnitude of an amplified current provided to the capacitor.

13. The system of claim 12, wherein the system controller further comprises:
a second switch that couples a base terminal of the power transistor to the capacitor, wherein the comparator closes the second switch after the comparator detects that the turn-on threshold voltage for the switch controller is reached and wherein current flows through the second switch after the turn-on threshold voltage for the switch controller is reached.

14. The system of claim 13, further comprising:
two diodes in series that permit current flow from the base terminal of the power transistor to the capacitor.

15. The system of claim 12, wherein the first switch comprises a gate controlled PFET transistor.

16. The system of claim 13, wherein the second switch comprises a diode.

17. The system of claim 13, wherein the second switch comprises a gate controlled PFET transistor.

18. The system of claim 13, wherein the resistor comprises a programmable resistor.

19. The system of claim 12, wherein the resistor controls a time to turn-on the switch controller.

20. A system comprising:
a transformer having primary, auxiliary, and secondary windings;
a power transistor coupled to the primary winding;
a system controller that controls whether the power transistor amplifies current or operates as a switch; and
a capacitor that supplies a voltage to the system controller, wherein the comparator comprises an Under-Voltage Lockout comparator with hysteresis, and wherein the system controller comprises:
a switch controller coupled to the power transistor, wherein the switch controller controls an on or off state of the power transistor when the power transistor operates as a switch; and
a comparator that indicates whether a turn-on threshold voltage for the switch controller has been reached, wherein the system controller causes the power transistor to amplify a current provided to the capacitor prior to the voltage reaching the turn-on threshold voltage for the switch controller, wherein a duration of time to turn-on the switch controller depends in part on a magnitude of an amplified current provided to the capacitor, wherein a first input terminal to the comparator is coupled to a reference voltage, and wherein a second input terminal to the comparator is coupled to measure the supplied voltage.

21. The system of claim 10, wherein the power transistor comprises an NPN power transistor that is emitter switched.

22. An apparatus comprising:
   a power transistor having a base, emitter, and collector terminals;
   a switch controller for the power transistor, wherein the switch controller controls whether the power transistor is in an on or off state; and
   means for charging a voltage source for the switch controller during start-up of the switch controller by using the power transistor to amplify current provided to the voltage source, wherein a duration of time to turn-on the switch controller depends in part on a magnitude of current provided to the voltage source.

23. The apparatus of claim 22, wherein the means for charging comprises:
   a comparator, wherein the comparator indicates whether a turn-on voltage for the switch controller has been reached and wherein the comparator controls a path of current to the voltage source.

24. The apparatus of claim 23, wherein the comparator controls a path of current to the voltage source to be a first path from an emitter terminal of the power transistor through a resistor and gate to the voltage source when the voltage source provides a voltage that is less than the turn-on threshold voltage for the switch controller.

25. The apparatus of claim 22, wherein the voltage source comprises a capacitor.

26. The apparatus of claim 22, wherein the power transistor comprises an NPN power transistor that is emitter switched.

27. A system comprising:
   a power transistor;
   a system controller comprising a switch controller coupled to the power transistor, wherein the switch controller controls an on or off state of the power transistor when the power transistor operates in a switch mode; and
   a capacitor that supplies a voltage to the system controller, wherein the system controller causes the power transistor to operate in an amplification mode prior to the voltage reaching a turn-on threshold voltage for the switch controller, wherein the power transistor amplifies a current provided to the capacitor in the amplification mode, and wherein a duration of time to turn-on the switch controller depends in part on a magnitude of the current provided to the capacitor.

* * * * *